Nov. 29, 1927.  
C. J. TRAVERS  
1,650,667  
POWER DRIVEN IMPLEMENT  
Filed July 2, 1923  
3 Sheets-Sheet 2

Witness:  
R. Burkhardt.

Inventor:  
Charles J. Travers,  
By Wilkinson Huxley Byron & Knight  
Attys

Nov. 29, 1927.  1,650,667
C. J. TRAVERS
POWER DRIVEN IMPLEMENT
Filed July 2, 1923  3 Sheets-Sheet 3
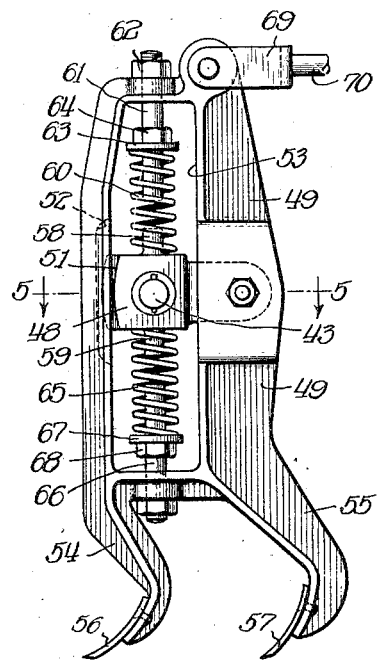
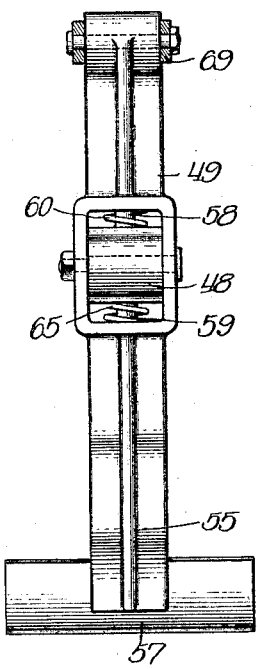
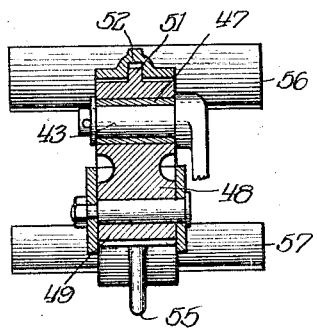
Inventor:
Charles J. Travers,
By Wilkinson Huxley Byron & Knight
Attys.

Patented Nov. 29, 1927.

1,650,667

UNITED STATES PATENT OFFICE.

CHARLES J. TRAVERS, OF PORT WASHINGTON, WISCONSIN, ASSIGNOR OF ONE-THIRD TO GEORGE T. STRITE AND ONE-THIRD TO HARRY W. BOLENS, BOTH OF PORT WASHINGTON, WISCONSIN.

POWER-DRIVEN IMPLEMENT.

Application filed July 2, 1923. Serial No. 648,911.

This invention relates to a new and improved power driven implement and more particularly to an implement carried by a power cultivator and operated by the power plant furnishing power to the cultivator.

In the usual types of cultivators, the action upon the soil is accomplished by implements which are stationary relative to the cultivator and move relative to the soil only as the cultivator moves. Due to the relatively low rate of speed of such cultivators, the action upon the soil is not applied with any considerable force. In cultivators of the present construction, implements, preferably of the hoe type, are carried by the cultivator and are moved relative thereto.

It is essential to provide means whereby the implements may be yieldingly mounted relative to the cultivator in order to avoid injury both to the implements and to the cultivator when the implements strike excessively hard or immovable surfaces, such as rock or the like.

It is an object of the present invention to provide power driven implements and implement carrying means adapted for use with power cultivators or the like and so constructed as to be yieldingly supported from the main frame of the cultivator.

It is also an object to provide means of this character driven from the cultivator power plant.

Other and further objects will appear as the description proceeds.

I have illustrated a preferred embodiment of my invention in the accompanying drawings in which—

Figure 3 is a view on an enlarged scale showing the implement supporting means and implements;

Figure 4 is a view of Figure 3 as seen from the left; and

Figure 5 is a horizontal section taken on line 5—5 of Figure 3.

Figure 1:
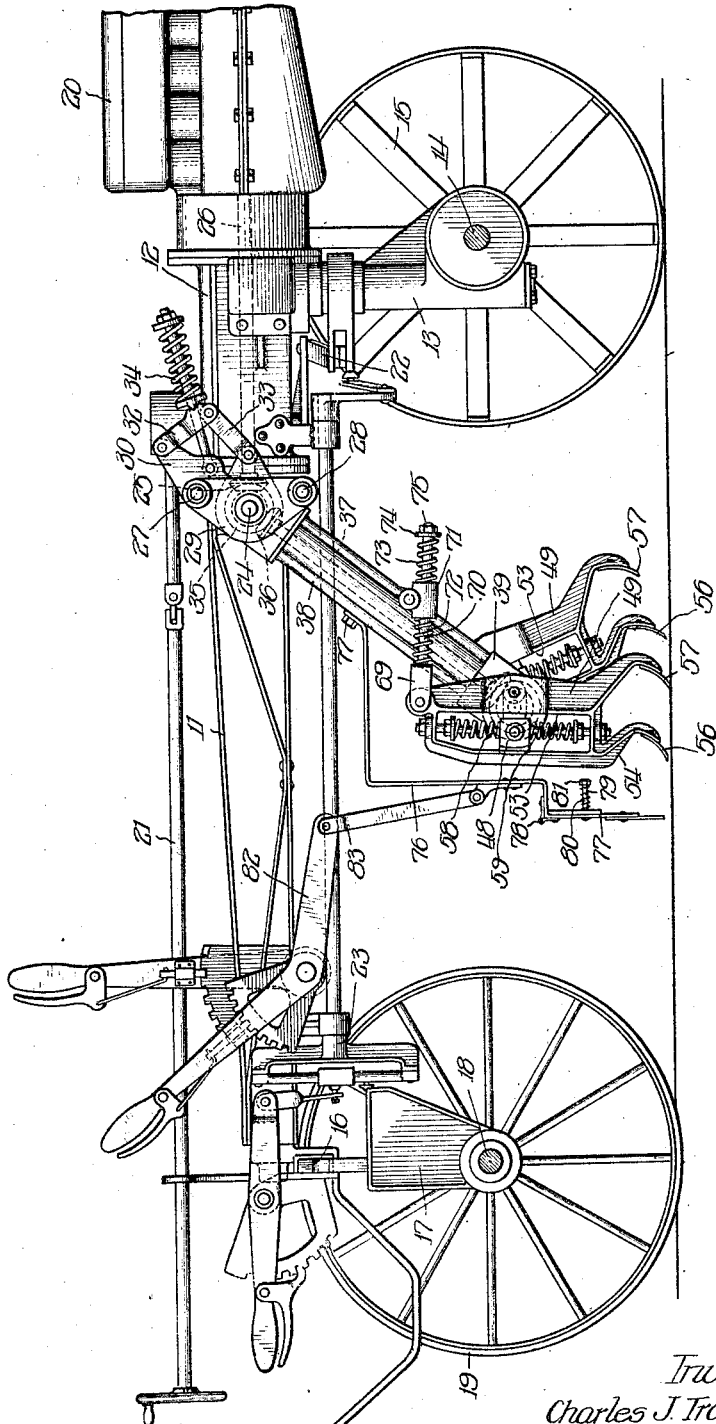
Figure 1 is an elevation of a tractor carrying my improved implement construction, the wheels upon the near side being removed for clearness.

Referring first to Figure 1, the cultivator comprises the main frame 11 connected at the front to the gear case 12 which is supported from housings 13 resting on the front axle 14 carrying wheel 15. The rear end is supported from the fixed axle 16 which latter is supported from members 17 which carry the axles 18 supporting the wheels 19. The engine 20 is supported from the gear case 12.

The cultivator is steered by shaft 21 by means of connection through links 22 to the housing 13. The rear wheels may be caused to steer with or contrary to the front wheels by means of mechanism 23. The construction heretofore mentioned forms no part of the present invention but is shown in order to faciltate the understanding of the application of the present invention.

The transverse shaft 24 is driven by bevel-gear 25 carried on a main transmission shaft 26. This drive may be controlled by any usual type of clutch and gear transmission (not shown). The fixed cross beams 27 and 28 carry adjacent each end fixed members 29 from which extends lug 30. A housing 31 is supported upon the shaft 24 and is movable about the axis of the shaft, this movement being assisted and controlled by links 32 and 33 and springs 34 which connect lug 30 and a lug on the housing.

Figure 2:
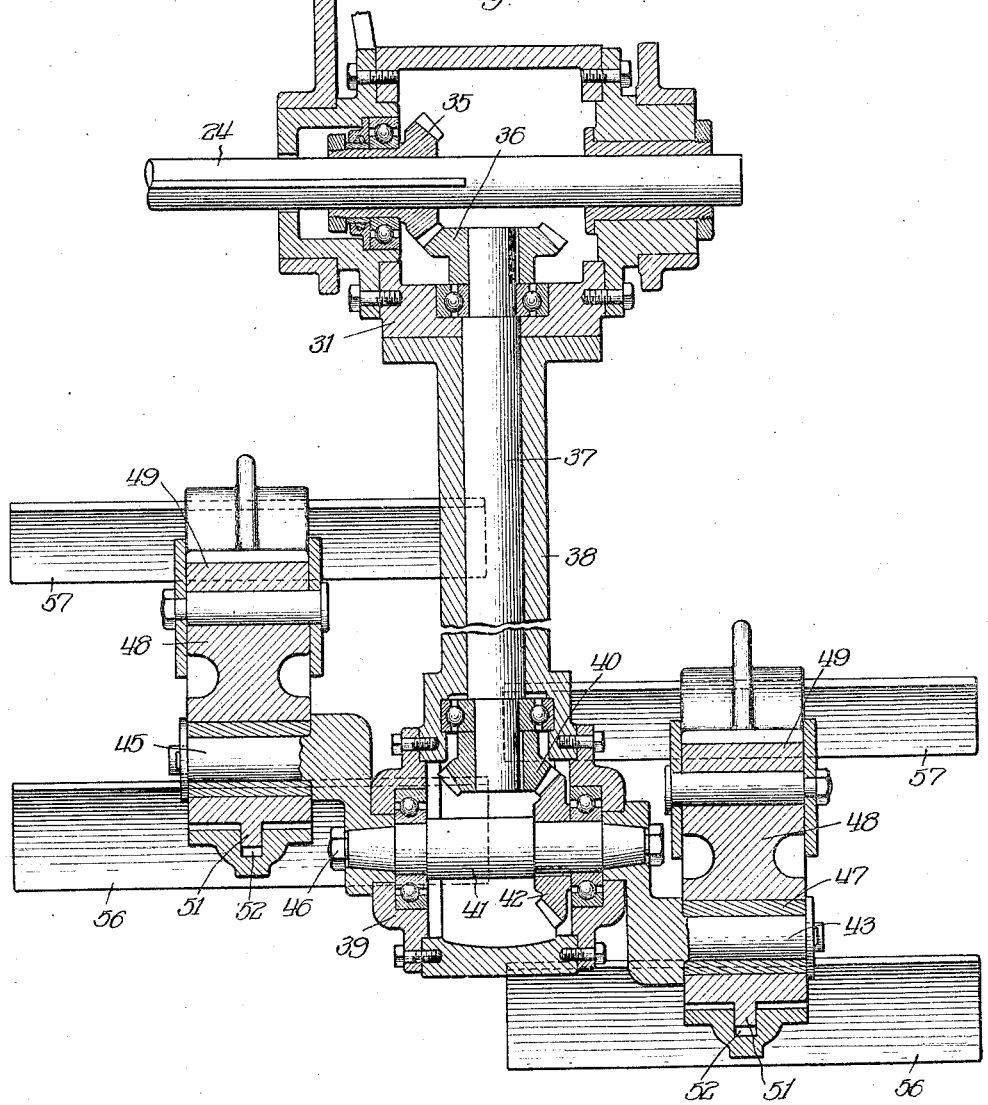
Figure 2 is a section on an enlarged scale showing the implement drive mechanism.

As shown in Figure 2 the shaft 24 has secured thereto the bevel-gear 35 in mesh with a similar gear 36 and the downwardly extending shaft 37. This shaft is enclosed in housing 38. The housing 39 is carried at the lower end of the housing 38 and encloses a bevel-gear 40 on the lower end of shaft 37. The housing 39 also supports the short cross shaft 41 to which is keyed the bevel-gear 42 meshing with bevel-gear 40.

As shown in Figure 2, the crank 43 is secured upon the right end of shaft 41 by nut 44. A similar crank 45 is secured to the opposite end of shaft 41 by nut 46, it being noted that the two cranks extend in reverse directions. The crank 43 extends into bearing 47 carried in link 48. This link 48 is pivotally secured in implement carrying frame 49 by means of pin 50. This assembly is best shown in Figures 3 to 5. The link 48 is provided with the guide flange 51 extending into recess 52 in the member 49.

As shown in Figure 3 the main portion of the link extends into an opening 53 formed in the implement supporting frame 49. The lower end of the frame 49 is provided with extensions 54 and 55 carrying hoe members 56 and 57, respectively.

The link 48 is provided upon its upper and lower faces with the lugs 58 and 59, respectively. A compression spring 60 has its lower end fitting around lug 58 and its upper end around rod 61 which latter is threaded in place in the frame and locked against movement by nut 62. The washer 63 bears upon the upper end of spring 60 and is adjusted by means of nut 64. A similar spring 65 bears against the lower face of link 48 surrounding stud 59. The lower end of this spring 65 surrounds rod 66 and is supported by washer 67, adjusted by nut 68.

As best shown in Figure 1, the upper end of the implement carrying frame 49 has secured thereto the bifurcated end 69 of the rod 70. This rod 70 extends through a sleeve 71 pivotally secured to the housing 38. The spring 72 is fitted upon rod 70 between sleeve 71 and the bifurcated portion 69. The spring 73 is fitted upon the outer end of rod 70 and is held against the sleeve 71 by washer 74 and nut 75. The bracket 76 is secured to housing 38 by nut 76'. The member 77 is pivotally secured at 78 to the lower end of the bracket 76. The stud 79 is secured to member 77 and passes through the lower end of bracket 76. The spring 80 surrounds this stud and is held in place by nut 81.

Levers 82 and links 83 are provided whereby the housing 38 and hoe assembly may be swung about the shaft 24. These features do not form a part of the present invention and will not be described in detail.

In the operation of the power driven hoes, power is supplied to the cross shaft 24 from the engine through bevel-gear 25 and shaft 26. The power is transmitted through the shaft 37 to the short cross shaft 41 and the cranks 43 and 45 describe a circular movement. Due to the connection of the upper ends of the implement supporting frames with the housing 38 through the rod 70, sleeve 71 and the associated springs, the hoes upon the lower ends of the frames do not describe a circular path but an approximately elliptical path, the greater axis of the ellipse being approximately parallel to the ground or slightly inclined thereto.

The soil is engaged by the hoes and thrown by them due to their rapid movement. Soil engaged by the rearmost hoes 57 is thrown against the back of hoe 56. The soil from hoe 56 is thrown against the member 77.

Should the hoes engage a stone or other obstacle, the springs 72 and 73 will yield in such manner as is necessary to prevent horizontal movement of the hoes regardless of the continued movement of the crank. The springs 60 and 65 will yield and the links 48 will move relative to the main implement supporting frames. The implements themselves may thus remain substantially immovable even though the cranks continue to rotate. The member 77 may also yield when necessary, the spring 80 being compressed during the yielding movement and serving to return the member to normal position after the obstacle is passed.

The construction shown is adapted to accomplish a rapid and thorough mulching action upon the soil and is so constructed as to yield when striking relatively hard or immovable objects thus avoiding injury not only to the implements but to the cultivator itself.

The construction is simple and may be manufactured at a relatively small cost and may be applied to cultivators of the type shown or other cultivators adapted to use movable power operated hoes or similar devices.

I claim:

1. In a power cultivator, a power driven crank, a hoe supporting member and hoe carried by said crank, and a yielding connection between the hoe supporting member and a fixed portion of the cultivator whereby movement of the hoe supporting member and hoe is limited, said yielding connection resisting movement in either direction from a normal position.

2. In a power cultivator, a power driven crank, a hoe supporting member and hoe carried by said crank, a sleeve pivotally secured to a fixed portion of the cultivator, a rod pivotally secured to the hoe supporting member and extending through the sleeve, and springs upon the rod and engaging opposite sides of the sleeve to yieldingly resist movement of the rod relative to the sleeve.

3. An implement supporting member comprising a main frame having an opening therein, a link pivotally connected to one side of the opening and extending therein, the link being provided with a guide flange fitting within a recess upon the opposite side of the opening, and means for yieldingly maintaining the link in position relative to the frame.

4. An implement supporting member comprising a main frame having an opening therein, a link pivotally connected to one side of the opening and extending therein, the link being provided with a guide flange fitting within a recess upon the opposite side of the opening, and compression springs supported within the opening and engaging opposite sides of the link to resist movement thereof relative to the frame.

5. An implement supporting member comprising a main frame having an opening therein, a link pivotally connected to one side of the opening and extending therein, the link being provided with a guide flange fitting within a recess upon the opposite side of the opening, and compression springs supported within the opening and engaging opposite sides of the link to resist movement thereof relative to the frame, the link being provided with means for connecting the frame to driving means, and the frame being provided with means for the attachment of implements thereto.

Signed at Port Washington, Wisconsin, this 21st day of May, 1923.

CHARLES J. TRAVERS.